United States Patent [19]

Wehner et al.

[11] Patent Number: 4,547,775
[45] Date of Patent: * Oct. 15, 1985

[54] FREQUENCY AGILE IMAGING RADAR WITH ERROR FREQUENCY CORRECTION

[75] Inventors: Donald R. Wehner; Michael J. Prickett, both of San Diego, Calif.

[73] Assignee: The United States of America as represented by the Secretary of the Navy, Washington, D.C.

[*] Notice: The portion of the term of this patent subsequent to Aug. 27, 2002 has been disclaimed.

[21] Appl. No.: 340,426

[22] Filed: Jan. 18, 1982

[51] Int. Cl.[4] .................. G01S 7/42; G01S 13/89
[52] U.S. Cl. ............................. 343/17.2 R; 343/17
[58] Field of Search ............... 343/5 AF, 7.5, 17.1 R, 343/17.2 R, 18 E, 17; 455/91, 123, 125; 331/5, 86, 87, 88, 90, 179

[56] References Cited

U.S. PATENT DOCUMENTS

| | | | |
|---|---|---|---|
| 3,168,712 | 2/1965 | Backnark | 455/91 X |
| 3,324,469 | 6/1967 | Szerlip | 343/17.2 R |
| 4,311,968 | 1/1982 | Pickering et al. | 331/90 |
| 4,360,788 | 11/1982 | Erps et al. | 328/15 X |
| 4,410,860 | 10/1983 | Kipp et al. | 331/17 X |

Primary Examiner—Salvatore Cangialosi
Assistant Examiner—Gilberto Barrón, Jr.
Attorney, Agent, or Firm—Robert F. Beers; Ervin F. Johnston; Harvey Fendelman

[57] ABSTRACT

A system is disclosed for utilizing frequency agile magnetron radars to perform one, two and three dimensional target imaging using coherent frequency agile radar waveforms. The pulses from a frequency agile magnetron are controlled so that their frequencies are approximately those of a highly coherent stepped frequency source. Means are provided for monitoring the magnetron's tuning piston position read-out voltage and for triggering the pulse forming network associated with the magnetron at the occurrence of each one of a set of predetermined read-out voltage levels. A feedback loop is utilized to determine the difference between the frequencies of the actual output pulses of the magnetron and a set of precise, stepped reference frequencies. Correction values are generated and are utilized to generate a new set of magnetron read-out voltage levels at which the pulse forming network is to be triggered. The phase of the echo pulse is measured for each frequency step of each burst from the magnetron. The transmit and echo phase are obtained from the in-phase and quadrature samples produced by two sample gates. Subtraction of the transmit phase from the receive phase is carried out digitally by a digital mixer.

17 Claims, 5 Drawing Figures

4,547,775

FREQUENCY AGILE IMAGING RADAR WITH ERROR FREQUENCY CORRECTION

CROSS REFERENCE TO RELATED APPLICATIONS

The present invention is related to U.S. patent application Ser. No. 268,501 filed May 29, 1981 in the names of Donald R. Wehner and Michael J. Prickett and entitled "Stepped Frequency Radar Target Imaging" and also to U.S. patent application Ser. No. 300,344 filed Sept. 8, 1981 in the name of Donald R. Wehner and entitled "3D Imaging With Stepped Frequency Waveforms and Monopulse Processing".

BACKGROUND OF THE INVENTION

The present invention relates generally to the fields of radar systems and to output frequency varying magnetrons and more specifically to the fields of inverse synthetic aperture radars and to stepped frequency radar transmitters.

The frequency agile magnetron imaging radar of the present invention can be used for generating range profiles and inverse synthetic aperture radar images from the range/Doppler characteristics of the target as measured using a stepped frequency waveform implemented for magnetron radars. The stepped frequency concept itself is a coherent radar technique described in U.S. patent application Ser. No. 268,501 referred to above. Briefly, the target range/Doppler behavior is obtained from the echoes produced by the target from a series of N "bursts" of n pulses. The N echo bursts are received over a period of time T as the target's aspect changes. Each burst contains a series of n pulses, each pulse being stepped $\delta f$ in frequency from the previous pulse. Echoes from each of the n pulses during a burst are sampled to obtain n complex pulses of the target, each at a different frequency. The inverse discrete Fourier transform of the series of n pulses of each burst is a "synthetic" range profile of the target. N bursts produce N range profiles. Aspect motion of the target relative to the radar during the collection of the N synthetic range profiles produces a Doppler frequency spread related to cross-range position of individual target scatterers. Doppler spectrum is measured for each range cell by a series of Fourier transforms, but now in the time history dimension for each range cell of the N bursts. The resulting $n \times N$ range/Doppler matrix is the inverse synthetic aperture radar image of the target. All signals are derived from a stable oscillator using direct frequency synthesis techniques.

A primary problem in the implementation of the inverse synthetic aperture radar concept described above as well as in the implementation of the 3D imaging radar system described in U.S. patent application Ser. No. 300,344 referred to above is the requirement for utilization of a coherent power amplifier to transmit the precise stepped frequency radar pulses. Existing radar systems may not include coherent power amplifier transmitters. Further, such amplifiers are very expensive when compared with the cost of magnetrons already in use in many radar systems.

SUMMARY OF THE INVENTION

The present invention offers a means for low cost conversion of existing magnetron radar systems to accomplish target imaging. In accordance with the present invention, the magnetron transmitter found in many existing radar systems today is utilized to form the required step frequency radar pulses necessary to accomplish radar target imaging. In accordance with the present invention, relatively unsophisticated tactical radars for ship and aircraft target detection can be modified to accomplish target imaging and identification. The present invention may be utilized to perform one, two, or three-dimensional target imaging using noncoherent magnetron radars where short time, phase, and frequency are not known precisely.

As will be disclosed further in detail, the present invention depends upon a technique to measure the phase delay and amplitude of a series of echoes from frequency stepping magnetron pulses. The pulses from the magnetron are controlled so that their frequencies are approximately those of a highly coherent stepped frequency source. The magnetron pulse frequency control is carried out utilizing dithered or other types of frequency agile magnetrons by controlling the pulse time of the magnetrons to result in transmitted pulses at the desired frequencies.

Control of the magnetron output signal frequency to approximate a highly coherent step frequency source is an important aspect of the present invention. It is to be understood that it is considered within the scope of the present invention, moreover, that the magnetron frequency control concept of the present invention may be utilized in environments other than radar systems. It is within the scope of the present invention that the magnetron frequency control disclosed herein may be used in any application where stepped frequency RF signals are required to be generated. Frequency accuracy commonly quoted for acutune magnetrons and for dither magnetrons are usually in excess of minimum required deviation for imaging. In accordance with the present invention, however, by constant calibration to precise synthesizer generated signals, the magnetron pulse frequency deviation is held to values near the required deviation. The magnetron frequency agility is accomplished by conventionally applying a varying, periodic waveform to the drive voltage terminal of the magnetron transmitter to control the position of a tuning piston inside the magnetron. The magnetron tuning piston position read-out voltage is monitored and the pulse forming network of the magnetron transmitter is triggered at each one of a set of predetermined read-out voltage levels. Updated read-out voltage levels for each frequency step $f_i$ are automatically generated. These voltage levels then become new magnetron pulse forming network trigger thresholds at precise $\delta f$ steps in synchronism with a stable precise synthesizer. Burst by burst trigger threshold correction is thereby accomplished. More particularly, a magnetron frequency control unit triggers both the magnetron to fire and a precise, stable frequency synthesizer to step in frequency to $f_i$ when the magnetron frequency read-out voltage $v$ reaches the $i^{th}$ stored value of $v_i$ corresponding to $f_i$. Inaccuracy or drift of frequency read-out voltage v vs magnetron frequency $f_m$ is automatically corrected by correcting the stored values $v_i$ vs $f_i$ values burst to burst. Correction values $\delta f_i$ are derived from the frequency error voltage generated by a frequency discriminator receiving inputs from the frequency synthesizer and from the output of the magnetron. $\delta f_i$ is converted to an equivalent $\delta v_i$. The new threshold voltage $v_i + \delta v_i$ is then used as a threshold for the $f_i$ step when the next burst begins.

The phase of the echo pulse is measured for each frequency step i=0 to n−1 of each burst. Echo phase is obtained by subtracting the phase of the intermediate frequency echo pulse signal at delay 2R/c for a target at range R, where c is the propagation velocity. The transmit and echo phase are obtained from the in-phase and quadrature samples produced by two sample gates which occur at $S_1$ and $S_2$ seconds from the main trigger pulse. $S_1$ occurs $T_3$ seconds after the leading edge of the transmit pulse. $S_2$ occurs $T_4$ seconds after the leading edge of the echo pulse arrives at the radar receiver.

The frequency agile magnetron imaging radar technique of the present invention is applicable as a targeting mode for many existing radar systems, both military and non-military. 1D range profile, 2D inverse synthetic aperture radar and 3D monopulse radar modes are possible using the present invention. Both ship and airborne targeting is possible. Additionally, incorporation of the present invention into existing radar systems can provide other advantages associated with wideband, coherent processing in addition to targeting. The present invention results in a wideband transmitted signal and narrowband processing which are basic ingredients for high ECCM capabilities. Coherent processing using the present invention may also be useful for moving target indicator systems. Finally, wideband signals can reduce target scintillation and thus provide better target protection in a search mode. By incorporation of the present invention into existing magnetron radar systems, such systems can be upgraded without overhaul of major high cost components such as antennas, pedestals, waveguides, control systems and displays.

OBJECTS OF THE INVENTION

Accordingly, it is the primary object of the present invention to disclose a novel technique for approximating highly coherent step frequency radars by utilizing a conventional magnetron transmitter.

It is a concomitant object of the present invention to disclose a stepped frequency radar imaging system utilizing a conventional magnetron transmitter.

Other objects, advantages and novel features of the invention will become apparent from the following detailed description of the invention when considered in conjunction with the accompanying drawings.

DESCRIPTION OF THE PREFERRED EMBODIMENT

Figure 1:
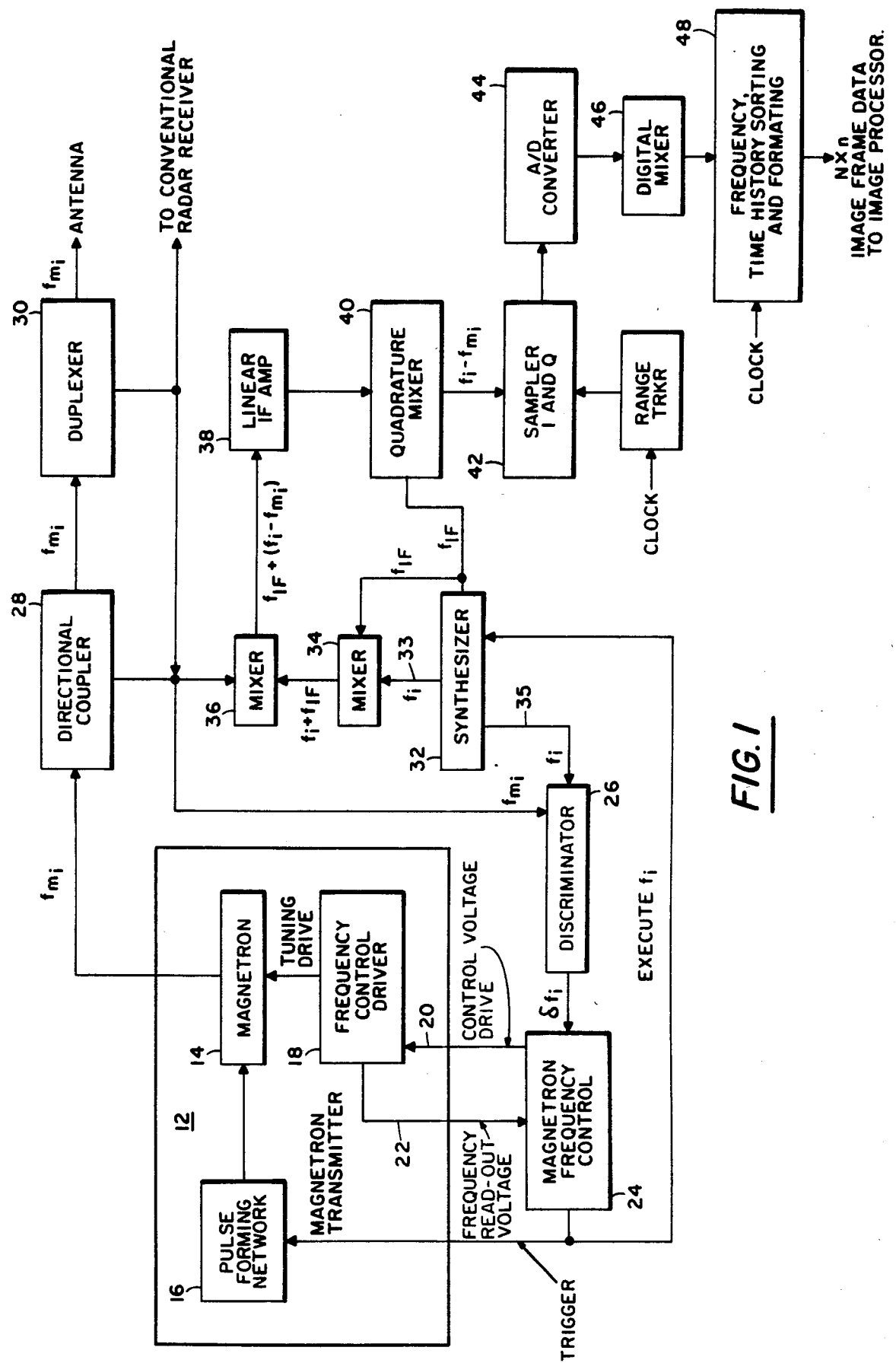
FIG. 1 is a block diagram of the frequency agile magnetron imaging radar system of the present invention.

Referring now to the various figures the present invention will be described. With reference to FIG. 1 the frequency magnetron imaging radar system of the present invention is illustrated. A conventional magnetron transmitter 12 is utilized. The magnetron transmitter 12 includes a magnetron 14, a pulse forming network 16 and a frequency control driver 18. The pulse forming network is operably coupled to a high voltage D.C. source (not shown) as would be readily understood. The frequency control driver 18 operates to provide the tuning drive to the magnetron 14 upon receipt of a control voltage drive signal on terminal 20. The frequency read-out voltage of the transmitter 12 is available on the frequency read-out voltage terminal 22 of the frequency control driver 18. Trigger pulses to the pulse forming network 16 are furnished by magnetron frequency control unit 24 which also provides the control voltage drive voltage to the frequency control driver via terminal 20. Magnetron frequency control unit 24 also receives the frequency read-out voltage on terminal 22 for processing. The magnetron frequency control unit 24, which preferably is implemented as a microprocessor, is designed to generate a varying, periodic waveform, preferably a sawtooth waveform, to the control voltage drive terminal 20 of the frequency control driver 18. It is to be understood, however, that waveforms other than sawtooth waveforms may be utilized in driving the frequency control driver 18. The frequency, frequency spread and waveform of the control voltage drive signal are therefore controlled by the magnetron frequency control unit 24. Likewise, the magnetron frequency control unit 24 is designed such that upon the occurrence of each one of a set of predetermined voltage levels on the readout voltage terminal 22, trigger pulses are furnished to the pulse forming network 16 as will be described in further detail below. Additionally, the magnetron frequency control unit receives correction signals from frequency discriminator 26 to be described further below and utilizes these frequency correction signals to generate a new set of voltage levels for comparison with the voltage levels occurring on the frequency read-out voltage terminal 22. As will be further explained below, this new set of frequency read-out voltage levels is utilized to determine the time to trigger the pulse forming network 16 for the second burst of frequencies. Similarly, each subsequent burst of frequencies to be transmitted by the magnetron transmitter 12 will be based upon a newly updated set of voltage levels calculated by the magnetron frequency control unit 24 in response to the frequency error signals $\delta f_i$ received from the frequency discriminator 26 computed for each of the corresponding pulses of the preceeding burst.

The output $f_{mi}$ of the magnetron 14 is furnished to a directional coupler 28. The frequency pulses $f_{mi}$ are subsequently provided to a duplexer 30 and finally to a radar transmitting antenna.

A frequency synthesizer 32 has one of its outputs, 35, connected to the frequency discriminator 26 for providing output frequency signals $f_i$ to the discriminator 26. The frequency signals $f_i$ are extremely stable, precise frequency signals. The frequency synthesizer 32 receives frequency stepping signals from the frequency control unit 24 as will be described below. Output 33 of the frequency synthesizer 32 is furnished to a mixer 34 which also receives an intermediate frequency output $f_{IF}$ from the synthesizer 32. The output of mixer 34 is taken to one input of mixer 36 which receives its other input from the directional coupler 28 as is illustrated. The output of mixer 36 is provided to linear intermediate frequency amplifier 38 which outputs the amplified signal from mixer 36 to quadrature mixer 40. Quadrature mixer 40 also receives the same intermediate frequency signal from synthesizer 32 as does mixer 34.

Sampling network 42 is connected to the output of quadrature mixer 40 and samples the in-phase and quadrature phase components of the transmit and echo signals as will be described. The output of sampler 42 is taken to analog-to-digital converter 44 and the digital information output of converter 44 is furnished to digital mixer 46. The output of mixer 46 represents the amplitude and phase of the echo signals with respect to the transmit signals. The output of digital mixer 46 may then be collated and formatted as indicated by unit 48 for providing image frame data to an image processor it is to be understood that the term "adjustable member" as used in this disclosure is intended to cover any component or mechanism utilized to tune the output frequency of the magnetron.

Figure 3:
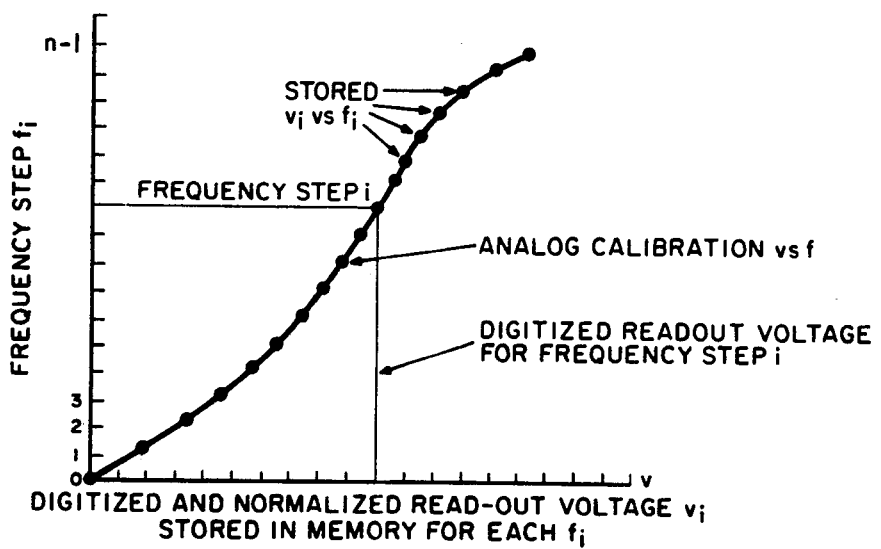
FIG. 3 is a plot of the frequency of the magnetron vs. readout voltage.

Referring to FIG. 3 there is illustrated a hypothetical magnetron output frequency vs. read-out voltage curve. In accordance with the present invention, it has been discovered that the frequency read-out voltage may be utilized to determine the time to trigger the pulse forming network 16. In order to understand this principle, reference is made to Table I below.

TABLE I

| (1) Initial trigger threshold settings $V_i$ vs $f_i$ | | (2) Freq. errors measured during first burst | (3) Equivalent readout voltage error | (4) New | (5) Freq. errors measured during 2nd burst | (6) Equivalent readout voltage error | (7) New |
|---|---|---|---|---|---|---|---|
| $f_i$ | $v_i$ | $\delta f_i$ | $\delta v_i$ | $v_i = v_i + \delta v_i$ | $\delta' f_i$ | $\delta' v_i$ | $v_1 = v_i + \delta v_i + \delta' v_i$ |
| $f_1$ | $v_1$ | $\delta f_1$ | $\delta v_1$ | $v_1 + \delta v_1$ | $\delta' f_1$ | $\delta' v_1$ | $v_1 + \delta v_1 + \delta' v_1$ |
| $f_2$ | $v_2$ | $\delta f_2$ | $\delta v_2$ | $v_2 + \delta v_2$ | $\delta' f_2$ | $\delta' v_2$ | $v_2 + \delta v_2 + \delta' v_2$ |
| $f_3$ | $v_3$ | $\delta f_3$ | $\delta v_3$ | $v_3 + \delta v_3$ | $\delta' f_3$ | $\delta' v_3$ | $v_3 + \delta v_3 + \delta' v_3$ |
| . | . | . | . | . | . | . | . |
| . | . | . | . | . | . | . | . |
| . | . | . | . | . | . | . | . |
| $f_n$ | $v_n$ | $\delta f_n$ | $\delta v_n$ | $v_n + \delta v_n$ | $\delta' f_n$ | $\delta' v_n$ | $v_n + \delta v_n + \delta' v_n$ |

(not shown).

Figure 2:
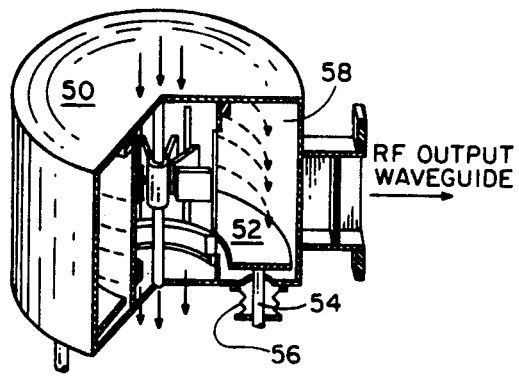
FIG. 2 is an isometric, partially cut away view of a coaxial magnetron set forth by way of example to illustrate a magnetron frequency tuning piston.

Before beginning a description of the operation of the present invention in order to facilitate an understanding of the present invention, reference will be made to FIG. 2 illustrating, by way of example, a partially cut away view of one type of magnetron suitable for use in the present invention. Referring to FIG. 2 it is seen that coaxial magnetron 50 has an annular tuning piston 52 driven by tuning rod 54 which couples to the tuning piston 52 from the exterior of the magnetron via a vacuum bellows 56. The tuning piston 52 is an adjustable member which may be moved up and down within the waveguide cavity 58. By moving of the tuning piston 52 within the cavity 58, the size and dimensions of the cavity 58 within the magnetron 50 are changed thereby changing the frequency of the RF output of the magnetron 50. With cross reference to FIG. 1 it is seen that the frequency controlled driver 18 serves as a transducer to drive the adjustable member of the magnetron in accordance with the control voltage drive signal appearing on terminal 20. It is to be understood at this point that although the tuning piston or other adjustable member of the magnetron 14 is being driven by driver 18, the magnetron 14 itself is not actually on until it receives a pulse from the pulse forming network 16. It should also be understood at this point that the particular frequency at which the magnetron 14 will fire when it does receive a pulse from pulse forming network 16 is dependent upon the particular position at which the tuning piston or other adjustable member of the magnetron is at the time the magnetron 14 receives a pulse from the pulse forming network 16. It is also to be understood at this point that the magnetron illustrated in FIG. 2 is shown by way of example only and that other types of frequency variable magnetrons are within the scope of the present invention and also that other types of adjustable members for tuning the output frequency of the magnetron when fired then the tuning piston 52 illustrated in FIG. 2 are also considered within the scope of the present invention. For instance, magnetrons having solid state tuning mechanisms such as diode tuned magnetrons are within the scope of the present invention and A priori information about the magnetron 14 may be obtained in a format as illustrated in Table I above. Referring to column (1) of Table I, the principle is represented that when the read-out voltage $v_i$ is at a predetermined level, the output frequency of the magnetron 14 may be expected to oscillate at or near the frequency $f_i$. Thus, at voltage level $v_1$, the output frequency of the magnetron may be expected to be at or near the frequency $f_1$. Similarly, if the magnetron is fired when the frequency read-out voltage reaches level $v_2$ appearing on output terminal 22, the output frequency of the magnetron may be expected to be at or near the frequency $f_2$. This is similarly true for each of the read-out voltage values $v_3$ through $v_n$.

Referring to FIG. 1 and to Table I the frequency stepping function of the frequency agile magnetron imaging radar system of the present invention will now be described. It is understood that in the present embodiment the magnetron transmitter 12 will provide N bursts of n pulses each. In order to accomplish this, the magnetron frequency control unit 24 applies a control voltage drive signal to terminal 20 of the frequency control driver 18. As stated above, this control voltage drive signal preferably has a sawtooth type waveform. Upon receiving the drive signal from the frequency control unit 24, the frequency control driver 18 functions to adjust the tuning piston or other adjustable member of the magnetron 14. As the adjustable member of the magnetron 14 is being driven by the variable voltage waveform from the magnetron frequency control unit 24, the frequency read-out voltage appearing on output terminal 22 will be varying also. Magnetron frequency control unit 24 senses the output voltage on terminal 22 and when the voltage reaches the voltage level $v_1$ indicated in Table I above, the magnetron frequency control unit 24 triggers the pulse forming network 16 to fire the magnetron 14. Simultaneously with the firing of the magnetron 14 the frequency synthesizer 32 is initiated to generate a highly stable output signal at the frequency $f_1$. It is noted at this point that, due to magnetron 14 instability, the first output pulse from the magnetron 14 will most likely not be precisely at the frequency $f_1$. The actual frequency of the output signal $f_{mi}$ from magnetron 14 is sensed via directional coupler 28 by the frequency discriminator 26 which also is at that time receiving the precise frequency signal $f_1$ from the synthesizer 32. Frequency discriminator 26 compares the signal $f_{m1}$ from the output of the magnetron 14 with the signal $f_1$ from the output of the synthesizer 32. Frequency discriminator 26 provides an input signal to the magnetron frequency control unit 24 that represents the difference between the precise stable frequency $f_1$ and the frequency of the output pulse $f_{m1}$ actually transmitted by the magnetron 14. This frequency error signal $\delta f_1$ is stored in the magnetron frequency control unit.

When the frequency read-out voltage on terminal 22 reaches the value $v_2$, the magnetron frequency control unit again provides a trigger signal to the pulse forming network 16 to fire the magnetron 14 and simultaneously provides a stepping signal to synthesizer 32 such that synthesizer 32 provides an output signal at frequency $f_2$. The output signal $f_2$ of the synthesizer 32 is compared with the second pulse $f_{m2}$ from the output of the magnetron 14 by discriminator 26 and a second frequency error signal $\delta f_2$ is stored in magnetron frequency control unit 24. Likewise, a trigger signal is transmitted to the pulse forming network 16 and a frequency stepping signal is transmitted to the synthesizer 32 each time one of the voltage levels $v_3, \ldots, v_n$ is reached on output terminal 22. For each of the n pulses of the first burst therefore a frequency correction signal is generated and stored in the magnetron frequency control unit 24. The corresponding frequency correction error signals $\delta f_1, \delta f_2, \ldots, \delta f_n$ are illustrated in column 2 of Table I above.

Magnetron frequency control unit 24 utilizes the frequency error signals $\delta f_i$ to generate an equivalent read-out voltage error value $\delta v_i$. These values are illustrated in column 3 of Table I above. Also, magnetron frequency control unit 24 calculates a new trigger threshold value $v_i$ equal to $v_1 + \delta v_1$ as illustrated in column 4 of Table I above. These new trigger threshold values as illustrated in column 4 of Table I above are utilized during the second burst of n pulses to set the time of occurrence of the trigger pulses from the magnetron frequency control unit 24 to the pulse forming network 16. The process is repeated for each of the N bursts required for the target imaging process. Thus, inaccuracy or drift of frequency read-out voltage vs magnetron frequency is automatically corrected by correcting the stored $v_i$ vs $f_i$ values burst to burst.

Figure 4:
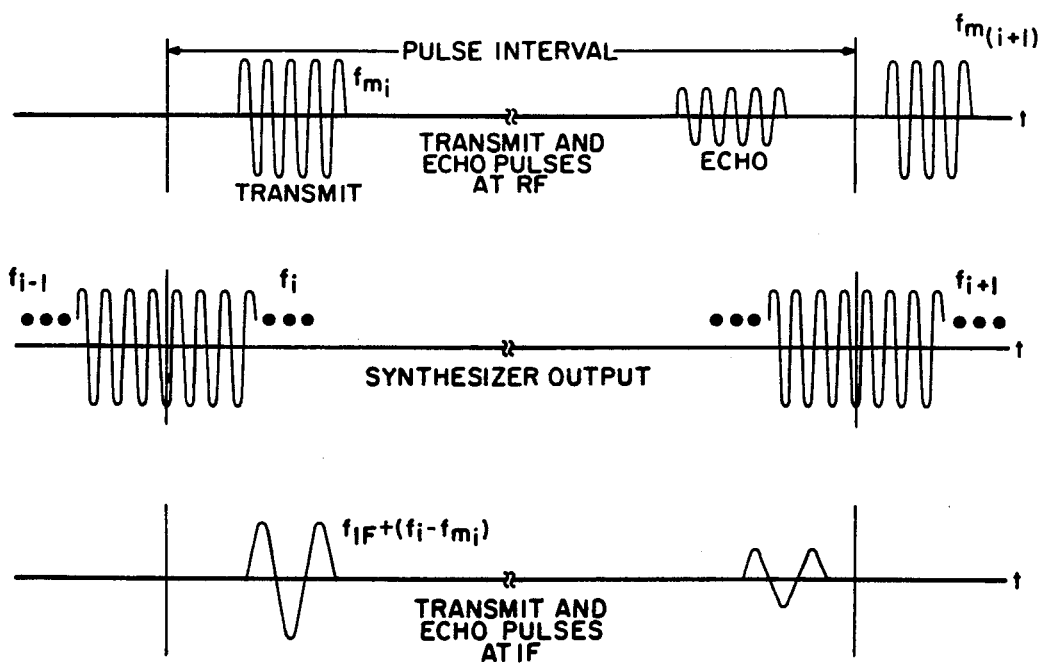
FIG. 4 is a plot of transmit and echo waveforms.
Figure 5:
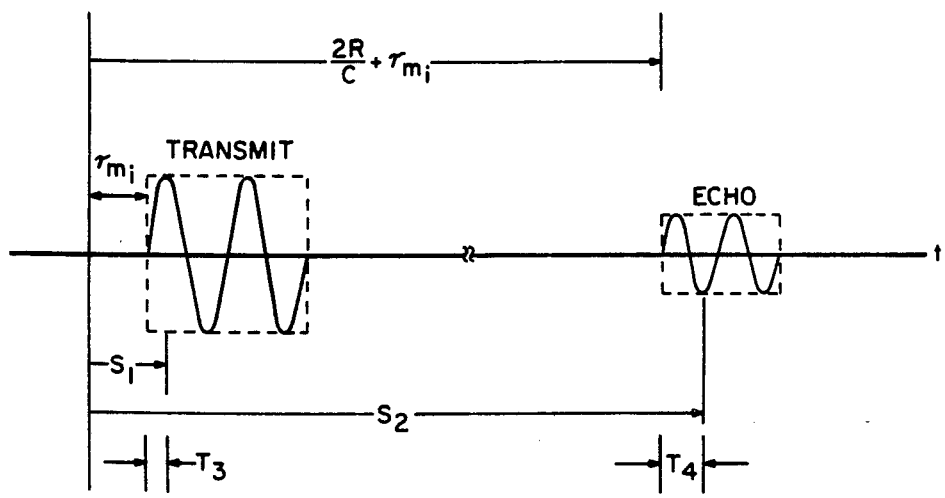
FIG. 5 is a plot of intermediate frequency waveforms and a summary of phase relationships.

In order to do target imaging it is necessary that the phase of the echo pulse be measured for each frequency step $i = 0$ to $n - 1$ of each burst. The echo phase is obtained by subtracting the phase of the intermediate frequency transmit pulse signal from the intermediate frequency echo pulse signal at the delay $2R/c$ for a target at range R, where c is the propagation velocity. With reference to FIG. 1, the echo pulse phase is obtained as follows. Duplexer 30 operates in conventional fashion to separate transmit and received radar pulses. Considering first the transmit pulse, on a pulse by pulse basis, it is seen that frequency synthesizer 32 puts out two output frequencies $f_i$ and $f_{IF}$, $f_i$ corresponding to the frequency steps $f_1, f_2, f_3, \ldots, f_n$ as illustrated in column 1 of Table I above. Thus, for the first pulse of the system the frequency synthesizer will output on terminal 33 a signal at output frequency $f_1$ identical to the frequency on output terminal 35. This signal $f_1$ on terminal 33 is mixed by mixer network 34 with the intermediate frequency signal $f_{IF}$ from the synthesizer such that mixer 34 outputs a sum signal $f_i + f_{IF}$ which is the input to mixer 36. Mixer 36 combines this signal $f_i + f_{IF}$ with a sample of the signal $f_{mi}$ actually transmitted by the magnetron 14 via directional coupler 28. Mixer 36 then provides an output signal that is the difference between its two inputs, i.e. $f_{IF} + (f_i - f_{mi})$. This latter signal is amplified by linear intermediate frequency amplifier 38 and the signal so amplified is provided as one of the inputs to quadrature mixer 40. Quadrature mixer 40 also receives the intermediate frequency signal $f_{IF}$ from the synthesizer 32 and provides a difference output signal represented by the quantity $f_i - f_{mi}$. The transmitted pulse difference $f_i - f_{mi}$ is sampled and held by sampling network 42 for the I and Q components of the signal. Before the next pulse is transmitted, the echo pulse returns via duplexer 30 and the echo pulse is mixed with the signal at the input to mixer 36 and is processed similarly to the transmit pulse by amplifier 38, quadrature mixer 40 and sampler 42 such that the quantity $f_i - f_{mi}$ for the echo pulse is sampled and held in sampler network 42. Examples of the timing of the transmit and echo pulses and corresponding synthesizer outputs are illustrated in FIG. 4. FIG. 5 illustrates the output of the quadrature mixer 40 which also illustrates the timing of the sampling of the transmit and echo pulses. Specifically, the transmit pulse is sampled at time $S_1$ occurring $T_3$ seconds after the leading edge of the transmit pulse. The echo pulse is sampled at time $S_2$ occurring $T_4$ seconds after the leading edge of the echo pulse arrives at the radar receiver. Subtraction of the transmit phase from the receive phase is carried out digitally by the digital mixer 46 after analog-to-digital conversion by converter 44. The digital mixer 46 thus compares the I and Q components of the transmitted pulse with the I and Q components of the echo pulse. The output of the digital mixer 46 is thus the amplitude and phase of the echo signal with respect to the transmit signal. The information available at the output of the digital mixer 46 may subsequently be processed as image frame data for image processing.

Obviously many modifications and variations of the present invention are possible in the light of the above teachings. It is therefore to be understood that within the scope of the appended claims the invention may be practiced otherwise than as specifically described.

What is claimed is:

1. A signal generator comprising:
a magnetron transmitter including a magnetron and having a read-out voltage terminal, said magnetron transmitter including a pulse forming network operably coupled to said magnetron, said magnetron further including an adjustable member for varying the output frequency of said magnetron, said magnetron transmitter further comprising a magnetron control driver and having a driving voltage terminal, said adjustable member being operably coupled to said driving voltage terminal and being responsive to a change in the voltage on said driving voltage terminal to change the magnetron output frequency;
control means operably coupled to said magnetron and to said pulse forming network for providing trigger signals to said pulse forming network in response to the voltage signal on said read-out voltage terminal and for providing a periodically reoccurring voltage input to said driving voltage terminal, said control means providing one of said trigger signals to said pulse forming network each time the voltage level on said read-out voltage terminal reaches a different one of the voltage levels of a set of predetermined voltage levels;

means operably coupled to the output of said magnetron for sensing the output frequency of said magnetron; and frequency correction means operably coupled to said sensing means for generating a distinct frequency correction signal for each distinct output frequency signal of said magnetron.

2. The signal generator of claim 1 wherein:

said frequency correction means is operably coupled to said control means for providing said control means with a set of said distinct frequency correction signals, each one of said set of distinct frequency correction signals corresponding to a different one of said voltage levels of said set of predetermined voltage levels.

3. The signal generator of claim 2 wherein:

said control means is further for receiving said set of distinct frequency correction signals and, in response thereto, for generating a set of voltage correction values, each one of said voltage correction values corresponding to a different one of said set of predetermined voltage levels, said control means being further for generating a new set of voltage levels, each one of said new set of voltage levels being the sum of the corresponding one of said set of voltage correction values with the corresponding one of said set of predetermined voltage levels, said control means being further for generating a correction trigger signal to said pulse forming network each time the voltage level on said read-out voltage terminal reaches a different one of said new set of voltage levels.

4. The signal generator of claim 3 wherein said frequency correction means comprises:

a frequency synthesizer operably coupled to said control means; and a frequency discriminator operably coupled to said sensing means and to said frequency synthesizer.

5. The signal generator of claim 4 wherein:

said control means is further for providing stepping signals to said frequency synthesizer each time said control means provides one of said trigger signals or correction trigger signals to said pulse forming network.

6. The signal generator of claim 4 wherein:

said frequency synthesizer comprises means for stepping to a new distinct output frequency each time it receives one of said stepping signals.

7. The signal generator of claim 6 wherein said control means comprises a microprocessor.

8. The signal generator of claim 1 wherein:

said frequency correction means comprises frequency synthesizer means operably coupled to said control means;

said control means being further for providing a frequency stepping signal to said frequency synthesizer each time said control means provides one of said trigger signals to said pulse forming network;

said frequency synthesizer being operable for generating a different predetermined output frequency signal in response to receipt of each of said frequency stepping signals;

said frequency correction means further comprising a frequency discriminator operably coupled to said frequency synthesizer and to said sensing means for generating a set of difference signals, each said difference signal representing the frequency difference between the predetermined output frequency signal of said frequency synthesizer and the corresponding simultaneously occurring output frequency signal of said magnetron.

9. A signal generator comprising:

a magnetron transmitter including a magnetron having an adjustable member for varying the output frequency of said magnetron, said magnetron transmitter including a frequency control driver and having a read-out voltage terminal, said adjustable member being operably coupled to said driving voltage terminal and being responsive to a change in voltage on said driving voltage terminal to thereby change the magnetron output frequency, said magnetron transmitter including a pulse forming network operably coupled to said magnetron;

a coupler connected to the output of said magnetron;

a frequency discriminator operably coupled to said coupler;

a frequency synthesizer operably coupled to said frequency discriminator; and frequency control means operably coupled to said magnetron, to said pulse forming network, to said frequency synthesizer and to said frequency discriminator for providing trigger signals to said pulse forming network, for providing stepping signals to said frequency synthesizer, for providing a periodically reoccurring voltage input to said driving voltage terminal, and for sampling the voltage on said read-out voltage terminal.

10. The signal generator of claim 9 wherein:

said frequency control means provides one of said trigger signals to said pulse forming network each time said frequency control means detects one of a set of read-out voltage levels on said read-out voltage terminal;

said frequency control means provides one of said stepping signals to said frequency synthesizer each time said frequency control means detects one of a set of read-out voltage levels on said read-out voltage terminal; and said control means comprises a microprocessor.

11. A radar signal generating and processing system comprising:

a magnetron transmitter including a magnetron and having a read-out voltage terminal said magnetron transmitter including a pulse forming network operably coupled to said magnetron; and control means operably coupled to said magnetron and to said pulse forming network for providing trigger signals to said pulse forming network in response to the voltage signal on said read-out voltage terminal;

means for sampling the in-phase and quadrature phase components of each of the signals transmitted by said magnetron and for sampling the in-phase and quadrature phase components of each corresponding echo signal; and means operably coupled to said sampling means for generating signals representing the amplitude and phase angle of each said echo signal.

12. The radar signal generating and processing system of claim 11 wherein:

said magnetron further includes an adjustable member for varying the output frequency of said magnetron, said magnetron transmitter further comprising a magnetron control driver and having a driving voltage terminal, said adjustable member being operably coupled to said driving voltage terminal and being responsive to a change in the voltage on said driving voltage terminal to change the magnetron output frequency;

said control means is further for providing a periodically reoccurring voltage input to said driving voltage terminal;

said control means provides one of said trigger signals to said pulse forming network each time the voltage level on said read-out voltage terminal reaches a different one of the voltage levels a set of predetermined voltage levels, said system further comprising:

means operably coupled to the output of said magnetron for sensing the output frequency of said magnetron; and frequency correction means operably coupled to said sensing means for generating a distinct frequency correction signal for each distinct output frequency signal of said magnetron.

13. The radar signal generating and processing system of claim 12 wherein:

said frequency correction means is operably coupled to said control means for providing said control means with a set of said distinct frequency correction signals, each one of said set of distinct frequency correction signals corresponding to a different one of said voltage levels of said set of predetermined voltage levels;

said control means is further for receiving said set of distinct frequency correction signals and, in response thereto, for generating a set of voltage correction values, each one of said voltage correction values corresponding to a different one of said set of predetermined voltage levels, said control means being further for generating a new set of voltage levels, each one of said new set of voltage levels being the sum of the corresponding one of said set of voltage correction values with the corresponding one of said set of predetermined voltage levels, said control means being further for generating a correction trigger signal to said pulse forming network each time the voltage level on said read-out voltage terminal reaches a different one of said new set of voltage levels; and wherein said frequency correction means comprises:

a frequency synthesizer operably coupled to said control means; and a frequency discriminator operably coupled to said sensing means and to said frequency synthesizer.

14. The radar signal generating and processing system of claim 13 wherein said sampling means comprises:

a first mixer operably coupled to said frequency synthesizer;

a second mixer operably coupled to said first mixer;

an amplifier operably coupled to the output of said second mixer;

a quadrature mixer operably coupled to said frequency synthesizer and to said amplifier; and a sampling network operably coupled to the output of said quadrature mixer.

15. The radar signal generating and processing system of claim 14 wherein said generating means comprises:

an analog-to-digital converter.

16. The radar signal generating and processing system of claim 15 wherein:

said frequency synthesizer comprises mean for stepping to a new distinct output frequency each time it receives one of said stepping signals.

17. The radar signal generating and processing system of claim 16 wherein said control means comprises a microprocessor.

* * * * *